United States Patent [19]

Tan

[11] 4,384,591
[45] May 24, 1983

[54] TEST IN PLACE VALVE AND VALVE FITTING

[75] Inventor: Richard M. Tan, Murray, Utah

[73] Assignee: E-Systems, Inc., Dallas, Tex.

[21] Appl. No.: 218,725

[22] Filed: Dec. 22, 1980

Related U.S. Application Data

[63] Continuation of Ser. No. 931,880, Aug. 8, 1978, abandoned.

[51] Int. Cl.³ .................. F16K 43/00; F16K 31/44
[52] U.S. Cl. ................................. 137/322; 73/11; 73/168; 251/321; 285/190
[58] Field of Search ............... 137/315, 317, 319, 321, 137/322, 323, 329.4, 329.04; 73/168, 11; 251/321, 322, 323; 285/190

[56] References Cited

U.S. PATENT DOCUMENTS

| | | | |
|---|---|---|---|
| 1,067,583 | 7/1913 | Brague | 137/322 |
| 1,463,735 | 7/1923 | Varrieur | 251/322 |
| 2,172,311 | 9/1939 | Thomas | 137/322 |
| 2,281,604 | 5/1942 | Smith | 251/321 |
| 2,283,970 | 5/1942 | Buttner | 137/322 |
| 2,354,925 | 8/1944 | Mills et al. | 137/322 |
| 2,400,658 | 5/1946 | Shepherd | 285/190 |
| 2,606,736 | 8/1952 | Ferm | 251/321 |
| 2,632,462 | 3/1953 | Selwyn | 137/322 |
| 2,960,304 | 11/1960 | Goss | 251/321 |
| 3,098,382 | 7/1963 | Hoffman et al. | 73/168 |
| 3,237,638 | 3/1966 | Rothenberg | 137/321 |
| 3,270,557 | 9/1966 | McClocklin | 73/168 |
| 3,294,359 | 12/1966 | Bauer | 251/148 |
| 3,387,621 | 6/1968 | Schaff | 137/322 |
| 3,645,496 | 2/1972 | Rawlins | 137/322 |
| 3,720,091 | 3/1973 | Kieter | 73/11 |
| 4,131,010 | 12/1978 | Eyres | 73/11 |

FOREIGN PATENT DOCUMENTS

| | | | |
|---|---|---|---|
| 1105326 | 11/1955 | France | 251/DIG. 1 |
| 12724 | of 1899 | United Kingdom | 137/321 |
| 686638 | 1/1953 | United Kingdom | 285/190 |
| 843338 | 8/1960 | United Kingdom | 285/190 |

Primary Examiner—George L. Walton
Attorney, Agent, or Firm—Robert V. Wilder; Albert M. Crowder, Jr.

[57] ABSTRACT

A test in place poppet valve and fitting assembly having a minimal air volume internal configuration is provided for attaching a portable hydraulic test system to a snubber internal hydraulic line. The valve fitting includes structure for connection to the test system. After the valve fitting has been attached to the poppet valve, but before the poppet valve has been opened, a passageway and the interior of the poppet valve are evacuated and filled with hydraulic fluid. A remotely actuated, spring biased probe extends from the fitting through the passageway to engage a poppet for selectively opening the poppet valve. When actuated to an open position, a prong on the probe is inserted into a cavity, and the poppet is supported on the probe. Using the poppet valve and valve fitting, the test system may be attached to a snubber internal hydraulic line 12 without introducing an appreciable amount of air.

8 Claims, 5 Drawing Figures

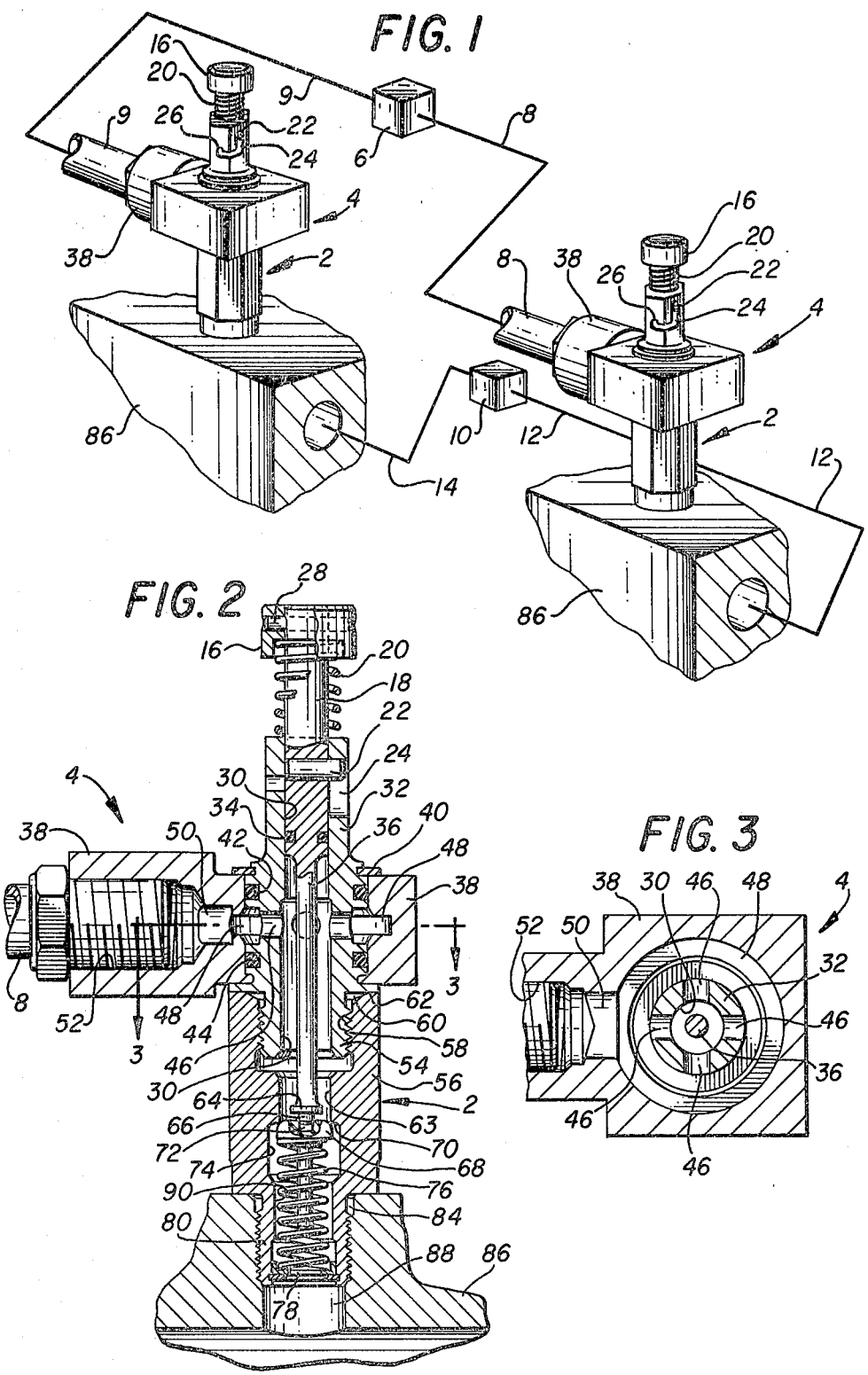

TEST IN PLACE VALVE AND VALVE FITTING

This is a continuation of application Ser. No. 931,880, filed Aug. 8, 1978 now abandoned.

TECHNICAL FIELD

The present invention relates to valves and valve fittings, and particularly to a valve having a minimal air volume internal configuration and a fitting for attachment to the valve.

BACKGROUND OF THE ART

Hydraulic snubbers are often used as shock absorbing devices in physical support systems that are designed to allow movement of the supported object. Such hydraulic snubbers typically include an internal control valve for controlling the shock absorbing characteristics of the snubber. In order to test the functional status of the snubber and the control valve without physically actuating the main cylinder of the snubber, hydraulic test systems have been developed for attachment to the hydraulic circuit of the snubber. Typically, the test system generates a flow of hydraulic fluid through the internal control valve of the snubber that simulates the hydraulic flow caused by actuating the main cylinder of the snubber. This procedure eliminates the need for removal and reinstallation of a snubber when checking its operational readiness.

However, conventional valves and fittings are generally not entirely suitable for attaching the portable test system to the hydraulic circuit of a snubber. Most conventional valves have an internal configuration that retains a volume of air in the closed position. If such valves were used to connect the test system to the snubber hydraulic circuit, the volume of air could be injected into the snubber hydraulic circuit. To avoid the injection of air into the hydraulic circuit, such conventional valves must be prefilled with hydraulic fluid before they are used to interconnect the test system and the snubber hydraulic circuit or before they are capped off after completion of testing. However, most conventional valves cannot be prefilled in an inverted position. Therefore, the usefulness of such conventional valves is limited. Also, at times, conventional valves used to connect two hydraulic systems together may develop leakage problems caused by improper reseating and resealing of the valve after opening and closing.

Thus, a need has arisen for a valve having a minimal air volume internal configuration that precludes the necessity for prefilling the valve with fluid before interconnecting two hydraulic systems and before installing a valve cap. Such valves could be used in an inverted position where prefilling would be difficult. Also, a need has arisen for a valve having a controlled reseating operation to avoid the possibility of leakage caused by improper reseating.

DISCLOSURE OF THE INVENTION

In accordance with the present invention, apparatus is provided for attaching a first hydraulic circuit to a second hydraulic circuit. A normally closed valve, having a minimal air volume internal configuration, communicates with the second hydraulic circuit, and a valve fitting is attached to the valve in a sealing relationship to provide for communication with the first hydraulic circuit. A passageway extends through the fitting and communicates with the valve, such that the interior of the valve and the passageway may be evacuated through said fitting and then filled with hydraulic fluid. An actuator is provided for remotely actuating the valve allowing the first hydraulic circuit to communicate with a second hydraulic circuit through the passageway. Thus, the first and second hydraulic circuits are hydraulically connected without introducing appreciable air or gases into the second hydraulic circuit.

In accordance with one embodiment of the present invention, apparatus are provided for attaching a first hydraulic system to a snubber hydraulic circuit. The hydraulic system is used to fill the snubber with hydraulic fluid or check the functional status of the internal control valve of the snubber without physically actuating the main cylinder of the snubber. A poppet valve is connected to the snubber hydraulic circuit and includes a valve passageway and a valve chamber separated by a valve seat. A poppet is mounted within the valve chamber with a spring for yieldably biasing the poppet against the valve seat to isolate the valve passageway from the valve chamber. A valve fitting is attached to the poppet valve in hydraulic communication with the valve passageway, and the valve fitting also includes structure for connection to the first system.

A fitting passageway extends through the valve fitting for hydraulically communicating with the valve passageway in the poppet valve, and a shaft is slidably mounted in the fitting passageway for moving between a deactuated and an actuated position. A probe extends from the shaft through the fitting passageway and the valve passageway for selectively engaging the poppet to open and close the poppet valve. The cross sectional area of the probe is less than the cross sectional area of the fitting passageway and the valve passageway, so that when the fitting is attached to the valve and the shaft is in a deactuated position, the first system communicates with the valve passageway through the fitting passageway. In this position, the first system may be operated to evacuate the fitting and the valve passageway and fill the same with hydraulic fluid before the poppet valve is opened.

A cavity is formed in the poppet for snuggly receiving mating structure on the end of the probe. When the shaft and probe are moved from the deactuated position to the actuated position, and the poppet is, thus, moved to the open position, the poppet is supported on the probe. The cavity and probe are operable to maintain concentricity and axial control of the poppet. In this manner, the probe will control the poppet and insure proper reseating against the valve seat and sealing when the poppet is moved to a closed position.

The fitting also includes a slot extending from the exterior surface of the fitting to the passageway inside the fitting. A projection extends from the shaft and through the slot, and a spring is provided for biasing the shaft out of the passageway in a direction away from the valve. The slot is dimensioned for engaging the shaft in two positions for selectively holding the shaft in an actuated position and a deactuated position.

The poppet valve includes a threaded receptacle, and a threaded nipple is provided on the valve fitting dimensioned for being threadedly attached inside the bore. An annular gasket is disposed adjacent to the threaded nipple near its base, and an annular surface is provided on the fitting for compressing the gasket against the valve to form a seal.

Also, a cap having a threaded nipple is provided for threaded insertion into the threaded bore of the poppet valve to cap the valve when not in use. The cap includes a plurality of gasket rings to form a seal with the valve. The cap is designed to trap a minimum volume of air in the poppet valve, and 20 thus, eliminates the need to fill the poppet valve with fluid and then let the excess fluid bleed out as the cap is installed. Such a procedure would normally be followed to minimize trapped air in the valve which might then migrate into the snubber. Where the poppet valve is located in an inverted position, a fluid prefilling procedure would be impossible.

BRIEF DESCRIPTION OF DRAWINGS

The advantages of the present invention will be readily appreciated by those of ordinary skill in the art as the same becomes better understood by reference to the following Detailed Description when considered in connection with the accompanying Drawings in which:

FIG. 1 is a perspective view of the valve and valve fitting symbolically shown attached to a first hydraulic system and a snubber hydraulic circuit;

FIG. 2 is a longitudinal partial cross section of the valve and valve fitting in the deactuated or closed position;

FIG. 3 is a partial cross sectional view taken generally along the lines 5—5 as shown in FIG. 2;

DETAILED DESCRIPTION OF DRAWINGS

Figure 4:
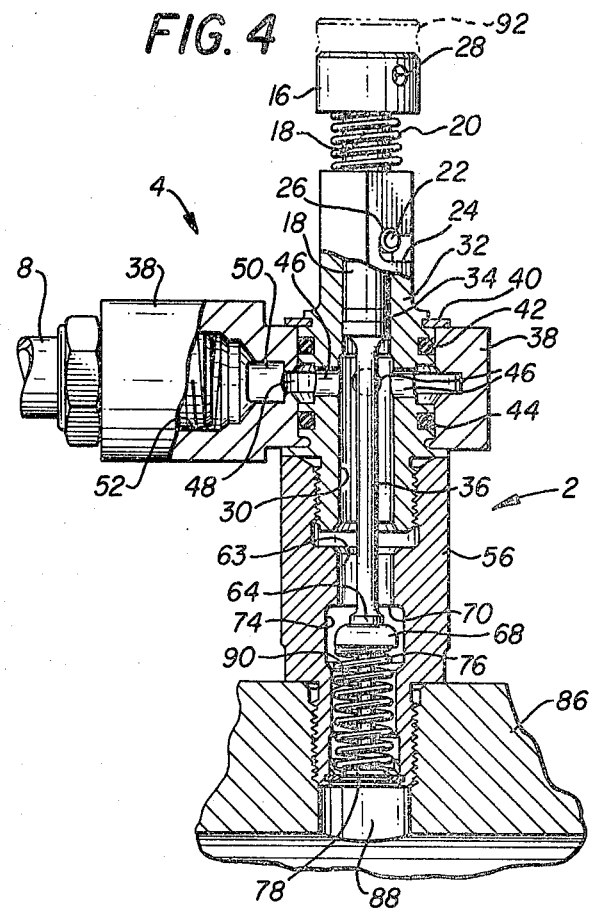
FIG. 4 is a longitudinal partial cross section of the valve and valve fitting in an actuated or open position.

Referring now to the Drawings in which like reference characters designate like or similar parts throughout the several views, there is shown in FIG. 1 a pair of valves 2 and valve fittings 4 embodying the present invention. The valve fittings 4 are symbolically shown attached to a portable hydraulic system 6 by hydraulic lines 8 and 9, and the valves 2 are symbolically shown as being connected to a snubber hydraulic system 10 by snubber internal hydraulic lines 12 and 14.

In the position shown in FIG. 1, the valve 2 and the valve fitting 4 are in a deactuated or closed position. The valve fitting 4 includes a knob 16 that is fixedly mounted on a cylindrical shaft 18. The shaft 18 is slidably mounted in the fitting 4, and a pin 22 extends outwardly from the shaft through a slot 24 in the fitting 4. To actuate or open the valve 2, the knob 16 is pressed downwardly against the force of spring 20. The pin 22 moves downwardly until it reaches the bottom of the slot 24. Then the knob 16 is rotated until the pin 22 engages the catch portion 26 of the slot 24. In this position, the catch portion 26 will hold the valve fitting 4 and the valve 2 in an open or actuated position, and the hydraulic system 6 and the snubber system 10 will be hydraulically interconnected through hydraulic lines 8 and 9, valve fittings 4, valves 2 and hydraulic lines 12 and 14.

Referring now to FIG. 2, there is shown a partial cross sectional view of the valve fitting 4 and the valve 2. The knob 16 is shown partially broken away to reveal a pin 28 extending therethrough to mount the knob 16 on the shaft 18. A passageway 30 is provided in a journal fitting 32, and the shaft 18 is slidably mounted in the passageway. A rubber sealing ring 34 provides a seal between the shaft 18 and the passageway 30, and yet, permits the shaft 18 to slide within the passageway 30. A cylindrical probe 36 extends coaxially from the shaft 18 and through the passageway 30 in a spaced apart relationship within the journal fitting 32.

A rotary union 38 is rotatably mounted on the journal fitting 32 and is held in position by a snap washer 40. Sealing rings 42 and 44 are mounted between the rotary union 38 and the journal fitting 32, and in this construction, the rotary union 38 is free to rotate about the journal fitting.

Referring to FIG. 3, a plurality of bores 46 are formed in the journal fitting 32 extending from the passageway 30 inside the fitting to the exterior of the journal fitting 32, and an annular channel 48 is formed in the rotary union 38 circumscribing the bores 46, such that the annular channel 48 and the passageway 30 hydraulically communicate through the bores 46. A passageway 50 in the rotary union 38 extends outwardly from the annular channel 48 to a threaded receptacle 52 that is attached to hydraulic line 8. In this assembly, the passageway 30 within the journal fitting 32 is in continuous hydraulic communication with portable hydraulic system 6.

The cross section of the journal fitting 32 and the rotary union 38 as shown in FIG. 3 is taken generally along line 5—5 of FIG. 2. In the center of this view, a cross section of probe 36 is shown in a spaced apart concentric relationship with the passageway 30. Four bores 46 extend from the passageway 30 outwardly and communicate with the annular channel 48. The annular channel 48 completely circumscribes the journal fitting 32 and will be in communication with the bores 46 regardless of the rotational orientation of the rotary union 38. A passageway 50 connects the annular channel 48 and the interior of receptacle 52. Thus, receptacle 52 and passageway 30 are constantly in hydraulic communication.

Returning to FIG. 2, the end of the journal fitting 32 opposite knob 16 includes a threaded nipple 54, and the valve 2 includes a valve housing 56 having a threaded receptacle 58 for receiving the nipple 54. An annular gasket 60 is mounted at the base of the threaded nipple 54 adjacent an annular surface 62 on the journal fitting 32. When the nipple 54 is threadedly inserted into the receptacle 58, the gasket 60 is compressed between the annular surface 62 and the valve housing 56, forming a fluid-tight seal between the valve 2 and the valve fitting 4.

Also, when threaded nipple 54 is attached within receptacle 58, the end of the probe 36 extends through the threaded nipple and out of the end of journal fitting 32 and into the valve 2. A passageway 63 is formed inside valve 2 adjacent receptacle 58 and is dimensioned to receive the probe 36 in a spaced apart relationship. A probe head 64 is formed on the end of the probe 36 with a prong 66 extending outwardly from the head 64 coaxially with the probe 36.

A poppet 68 is mounted within the valve housing 56 and is normally seated on a valve seat 70. When in a deactuated or closed position, the probe head 64 and the poppet 68 are adjacent but spaced slightly apart. The poppet 68 also includes a cavity 72 dimensioned to snugly receive the prong 66. When the shaft 18 and the probe 36 are actuated, the head 64 and the prong 66 move towards the poppet 68, and the prong 66 is inserted within the cavity 72. In this manner, the poppet 68 is supported on the probe head 64 in the actuated position.

A chamber 74 is formed inside the valve 2 adjacent passageway 63 with the valve seat 70 being disposed between the chamber and passageway. The poppet 68 is contained within chamber 74, and a spring 76 mounted on a base 78 biases the poppet 68 towards the valve seat 70 to maintain valve 2 in a normally closed position.

A threaded nipple 80 is formed on the end of housing 56 opposite from the receptacle 58 and is threaded into the snubber body 86. When nipple 80 is fully threaded into the snubber body 86, a sealing ring 84, mounted on the base of the threaded nipple 80, forms a seal between the nipple 80 and the snubber body 86. Passageway 88 and hydraulic lines 12 and 14 are formed in snubber body 86. A passageway 90 is formed within nipple 80 adjacent chamber 74, such that, referring to FIGS. 1 and 2, it will be appreciated that hydraulic lines 12 and 14 communicate continuously with chamber 74 through the passageways 88 and 90.

Referring now to FIGS. 1 and 2, the minimal internal air volume design of valve 2 and fitting 4 may be appreciated. When the fitting 4 is connected to the valve 2, the hydraulic system 6 is placed in hydraulic communication with the passageway 63 within the valve. Thus, the hydraulic system 6 may be used to evacuate passageway 63, and then, to fill the passageway 63 with hydraulic fluid before the valve 2 is actuated to an open position. As previously described, chamber 74 is in hydraulic communication with snubber hydraulic lines 12 and 14 and is, thus, filled with hydraulic fluid. In this assembly, hydraulic fluid contacts both sides of poppet 68 before the valve 2 is actuated open. There is no volume within the valve 2 containing an appreciable amount of air and gases. Thus, when valve 2 is actuated open, the injection of air in the snubber hydraulic body 86 is minimized.

Referring now to FIG. 4, there is shown a partial cross sectional view of the valve 2 and valve fitting 4 in the actuated position with valve 2 actuated to the open position. In the deactuated position, knob 16 is positioned as indicated by phantom lines 92. To actuate valve 2, the knob 16 is forced downwardly and rotated into the position shown in FIG. 4. When the knob 16 is forced downwardly, the shaft 18 and the pin 22 are also forced towards the valve 2. When the pin 22 reaches the bottom of the slot 24, it is rotated until the pin 22 is adjacent the catch portion 26 of the slot 24. When the knob 16 is released, the spring 20 forces the knob 16 outwardly until the pin 22 engages the catch portion 26. Pin 22 and catch 26 function to resist the force of spring 20 and maintain the shaft 18 in the actuated position.

Referring now to FIGS. 1, 2 and 4, when the shaft 18 is moved to the actuated position, the probe 36 is urged towards the poppet 68. The prong 66 is inserted within the cavity 72, and the probe head 64 engages and forces the poppet 68 away from the valve seat 70. In the actuated position, the valve 2 is open. It will be appreciated that when poppet 68 is displaced from valve seat 70, fluids may flow between the passageway 63 and chamber 74 by flowing around the poppet 68. Thus, when valve 2 is actuated to the open position, line 8 and line 12 are in hydraulic communication through the valve 2 and fitting 4. Similarly, when both valves 2 are actuated, lines 9 and 14 are in hydraulic communication. The passageway between line 8 and line 12 includes receptacle 52, passageway 50, annular channel 48, bores 46, passageway 30, passageway 63, chamber 74, passageway 90 and passageway 88.

It will also be appreciated that prong 66 and cavity 72 interact to maintain the concentricity and axial control of poppet 68 when in the open or actuated position.

When poppet 68 is forced away from the valve seat 70 and into chamber 74, it is no longer laterally supported by the valve housing 56. However, the poppet 68 is impaled on the probe 36 with the prong 66 snugly inserted within cavity 72. The rigidity of probe 36 maintains concentricity and axial control of the poppet 68 in the actuated position.

When the valve 2 is deactuated, the force of spring 76 will urge the poppet 68 to follow the probe head 64 back towards the valve seat 70. Thus, the probe 36 will guide the path of poppet 68 back towards the valve seat 70 and will insure that the poppet 68 properly reseats. In this manner, the valve 2 reliably reseals upon closing.

Figure 5:
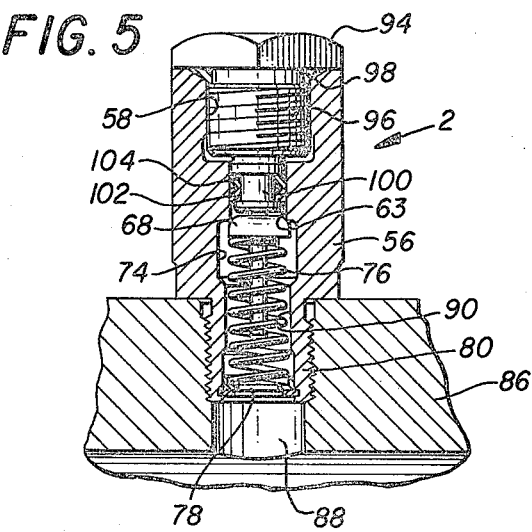
FIG. 5 is a longitudinal partial cross section of the valve with a cap thereon.

Referring now to FIG. 5, a partial cross sectional view of valve 2 is shown including a cap 94 for covering the valve during periods of non use. The cap 94 includes a threaded nipple 96 for threaded attachment inside the receptacle 58 in the valve housing 56. A sealing ring 98 is mounted near the base of cap 94 to form a seal between the cap 94 and the exterior of the valve housing 56. A probe 100 extends from the threaded nipple 96 into the passageway 63 within the valve housing 56, and an O-ring 102 and backup ring 104 are mounted side by side on probe 100 to form a seal between the probe 100 and the passageway 63. When O-ring 102 contacts passageway 63, a minimum volume of air is trapped between poppet 68, O-ring 102 and passageway 63. This air volume is sufficiently small, so that subsequent migration of the trapped air into the snubber internal hydraulic system 10 will not affect snubber operation. The configuration of the cap 94 and the mating receptacle 58 and passageway 63 thus eliminates the need for filling receptacle 58 and passageway 63 with fluid prior to installing cap 94. Such a filling procedure would be impossible if the poppet valve were in an inverted position. Thus, cap 94 provides additional sealing of the valve 2 when the valve is not in use.

Although a particular embodiment of the present invention has been described in the foregoing Detailed Description, it will be understood that the invention is capable of numerous modifications, rearrangements and substitutions of parts without departing from the spirit of the invention.

I claim:

1. A valve and cap assembly having a minimal internal air volume configuration for attachment to a snubber for connection to a test port of a hydraulic test system to test the main cylinder of the snubber without actuation thereof, comprising:

a valve housing having a port for connecting the test port of the hydraulic test system;

a chamber within said housing hydraulically communicating with the hydraulic test system;

a valve seat adjacent said chamber;

a passageway extending from said valve seat and contiguous with said chamber;

isolating means yieldably biased against said valve seat to isolate said chamber from said passageway;

a threaded receptacle in hydraulic communication with said passageway and extending to the exterior of said valve housing;

a cap having a threaded extension for being threadedly secured within said threaded receptacle and being dimensioned to mate with and substantially fill said threaded receptacle;

a projection extending from the threaded extension of said cap and extending to said isolating means, said projection being dimensioned to substantially fill said passageway before said cap is secured with the threaded receptacle whereby only a small amount of air is trapped within said receptacle and passageway, such that subsequent migration of the air into the hydraulic circuit will not affect the operation of the hydraulic circuit; and a seal encircling said projection for sealing engagement against the interior of said passageway when said cap is secured within said threaded receptacle.

2. The valve assembly as set forth in claim 1 further comprising a sealing ring mounted on said cap for engagement with the exterior of the valve housing when the cap is fully threaded into the receptacle, so that air may escape from the receptacle when the cap is being threadedly inserted into said receptacle until said sealing ring firmly engages said valve housing to prevent further escape of air from within said receptacle.

3. The valve assembly as set forth in claim 1 wherein said seal comprises at least one O-ring mounted on said projection for sealing against the interior of said passageway.

4. Apparatus for testing in place by means of a portable hydraulic test system having first and second test ports, comprising:
(1) a hydraulic snubber comprising:
 (a) a main cylinder;
 (b) first and second snubber ports opening into separate chambers of said main cylinder; and
 (c) an internal control valve and wherein the snubber is tested without physically actuating the main cylinder;
(2) a valve fitting connected to each of the first and second snubber ports, each said valve fitting comprising:
 (a) a valve housing including a connecting port for attachment to a snubber port;
 (b) a chamber within said housing communicating with the main cylinder;
 (c) a valve seat at one end of said chamber opposite the connecting port attachment to the snubber port;
 (d) a passageway extending from said valve seat to the exterior of said housing;
 (e) a poppet valve having a head portion disposed within said chamber and yieldably biased against said valve seat to isolate said chamber from said passageway, said head portion of said poppet valve including receiving means at a point facing said passageway;
 (f) means for removable attachment to said valve housing for placing said passageway in hydraulic communication with the test system, whereby hydraulic fluid is introduced into said passageway from the test system when said poppet valve is disposed against said valve seat; and
 (g) actuating means extending through said means and into said passageway for forcing said poppet valve away from said valve seat into said chamber to place the hydraulic test system into hydraulic communication with the main cylinder, said actuating means including positioning means for engaging said receiving means to maintain concentricity and axial control of said poppet valve when forced away from said valve seat, so that said poppet valve properly reseats against the valve seat and seals the chamber from said passageway when biased against said valve seat.

5. Apparatus for testing in place a hydraulic snubber having first and second snubber ports each connected to a separate valve fitting, an internal control valve, and a main cylinder for testing the functional status of the internal control valve of the snubber without physically actuating the main cylinder of the snubber, said apparatus comprising:

a portable hydraulic test system having first and second test ports;

first and second poppet valves, one connected to each port of the snubber and having a poppet with a head portion in a chamber and a spring for yieldably biasing the head portion of said poppet against a valve seat into a closed position, said poppet including receiving means; and a valve fitting connected to each of the poppet valves, said valve fitting comprising:
 a valve housing for sealing attachment to said poppet valve, said housing having a connecting port;
 means for connecting the connecting port to one of the test ports of said test system;
 a passageway in said valve housing in communication with the chamber of said poppet valve;
 a shaft slidably mounted in said passageway and movable between a deactuated and an actuated position;
 a probe extending from said shaft through said passageway for selectively engaging the receiving means of said poppet to open said poppet valve when said shaft is moved from the deactuated position to the actuated position;
 said probe having a cross sectional area less than said passageway, so that the test system communicates with said valve through said passageway; and
 said test system being operable to evacuate said valve housing and said poppet valve when said valve housing is attached to said poppet valve and said poppet is in a closed position.

6. The apparatus as set forth in claim 5 wherein said receiving means includes a cavity formed in said poppet for receiving said probe when said shaft is moved to the actuated position, said cavity and probe being operable to maintain concentricity and axial control of said poppet when in an open position, so that said poppet properly seals when moved to a closed position.

7. The apparatus as set forth in claim 5 further comprising:
 a threaded receptacle in said poppet valve;
 a cap having a threaded cap nipple dimensioned for threaded attachment within said threaded receptacle, said cap being operable to provide additional sealing when said fitting has been removed from said valve; and
 a projection extending from said cap for engaging the interior of said poppet valve to form a seal, said projection and cap having a volume to substantially fill the interior of the threaded receptacle of said poppet valve.

8. Apparatus for testing in place a hydraulic snubber by means of a portable hydraulic test system, the snubber having first and second snubber ports each connected to a separate valve fitting, each valve fitting including a poppet valve operational for testing the hydraulic snubber, an internal control valve and a main cylinder, wherein the snubber is tested without physically actuating the main cylinder, the valve fitting connected to each of the first and second ports comprising:

a fitting housing having first and second ends;

a first passageway extending between said first and second ends;

a shaft slidably mounted in the passageway in a sealed relationship and extending out of said first end of said fitting housing;

a probe extending from the shaft through the passageway in a spaced apart relationship and out of said second end of said fitting housing;

at least one bore extending transverse from a portion of said passageway containing the probe and the exterior of said fitting housing;

a rotary union having a connecting port and an annular channel, said union rotatably mounted on said fitting housing adjacent said bore and including a second passageway for communicating with said first passageway through said bore;

means for attaching the connecting port of said rotary union to a snubber port of the hydraulic test system; and means for attaching said second end of said housing to an inlet port of the snubber.

* * * * *